United States Patent Office 3,337,545
Patented Aug. 22, 1967

3,337,545
PENTACYCLIC FUSED RING AMINES
Charles L. Zirkle, Berwyn, Pa., assignor to Smith Kline
& French Laboratories, Philadelphia, Pa., a corporation of Pennsylvania
No Drawing. Filed June 24, 1965, Ser. No. 466,849
14 Claims. (Cl. 260—243)

ABSTRACT OF THE DISCLOSURE

8 - aminoalkyl - 8H - indolo[3,2,1 - de]acridanes are prepared by reaction of an aminoalkyl Grignard reagent with an 8-oxo compound and reduction of the resulting alcohol with formic acid and sodium formate, 9-aminoalkyl-9H-quino[3,2,1-kl]phenothiazines and 9H-quino-[3,2,1-kl]phenoxazines are prepared in an analogous manner. The hydroxy intermediates may also be dehydrated by heating, and the resulting olefins hydrogenated to the products. The products are antidepressants and central nervous stimulants.

---

This invention relates to chemical compounds having central nervous system activity and to intermediates therefor. In particular, the invention relates to aminoalkyl substituted 8H-indolo[3,2,1-de]acridanes, 9H-quino[3,2,1-kl]phenothiazines, and 9H-quino[3,2,1-kl]phenoxazines having primarily antidepressant and central nervous system stimulant activity.

The compounds are especially useful in experimental pharmacology in studying drug action and for comparison purposes in evaluating potential medicinal agents. Exemplary of the activities shown by compounds of the invention is the reserpine ptosis, indicative of antidepressant activity, shown by the compounds 8-(3-dimethylaminopropyl)-8H-indolo[3,2,1-de]acridane when administered orally at 50 m.p.k. to rats and 9-(3-dimethylaminopropyl)-9H-quino[3,2,1-kl]phenothiazine when administered orally at 25 m.k.g. according to standard experimental procedures. The latter compound also induces central nervous system stimulatory action when administered to rats orally at doses of 100–200 m.p.k.

The compounds of the invention may be represented by the following structural formula:

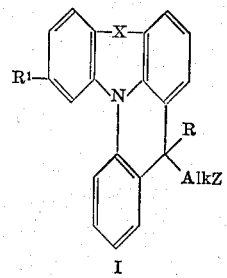

I wherein:

X is sulfur, oxygen, or a single bond;
R is hydrogen or hydroxy;
$R^1$ is hydrogen, chloro, or trifluoromethyl;
Alk is propylene or 2-methylpropylene; and
Z is dilower alkylamino, pyrrolidino, piperidino, morpholino, or 4-methylpiperazino.

The term "lower alkyl" is intended to represent those alkyl groups having up to about five carbon atoms, particularly methyl, ethyl, propyl, and butyl.

The invention is thus principally concerned with compounds of structures II–IV, in which X of Formula I is, respectively, a single bond, sulfur, and oxygen; and R, $R^1$, Alk, and Z are defined above.

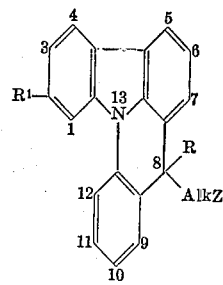

II

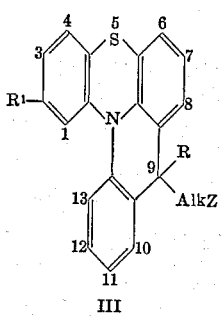

III

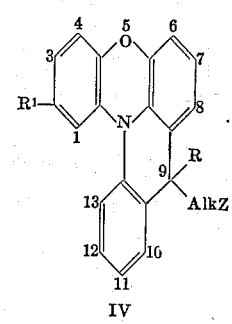

IV

Compounds of Formulas I–IV in which R is hydrogen are the principal compounds of the invention, having central nervous system activity. Compounds in which R is hydroxy are intermediates for the preparation of compounds in which R is hydrogen.

The invention is also concerned with compounds of Formula V

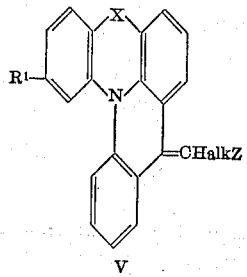

V in which X, $R^1$, and Z are as defined above, and Alk is an ethylene or 1-methylethylene chain. Compounds of Formula V are intermediates useful for the preparation of the final products of Formulas I–IV.

Compounds of Formula II in which $R^1$ is hydrogen are prepared by treatment of the known ketone 8H-indolo-[3,2,1-de]acridan-8-one [VI, J. Am. Chem. Soc. 63, 1758 (1941)] with the appropriate Grignard reagent VII in an inert solvent such as tetrahydrofuran, dioxane, or ether. The reaction mixture is

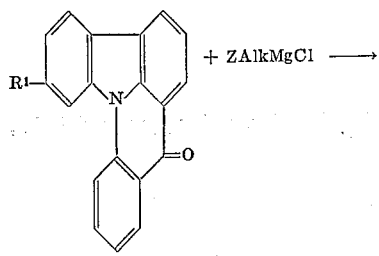

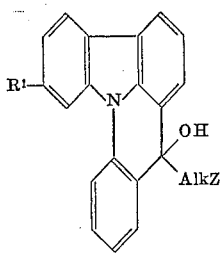

VII generally refluxed for a period of about 2-8 hours and then worked up in conventional manner to yield a compound of Formula II, in which R is hydroxy. Treatment of this intermediate with a mixture of formic acid and sodium formate by refluxing for about 24 hours results in the formation of the final product of Formula II, in which R is hydrogen.

Alternatively, the hydroxy intermediate is distilled in vacuo to achieve dehydration to the useful intermediate compound VIII. This aminoalkylidene intermediate is then reduced by catalytic hydrogenation to give the final

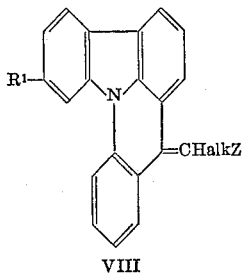

VIII product II (R=H).

Another method for converting the hydroxy intermediate II (R=OH) into the final product consists of heating with a mineral acid such as hydrochloric or sulfuric acid. The resulting intermediate salt IX is then treated with

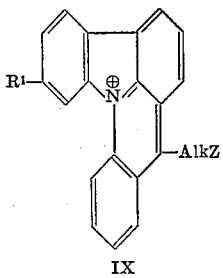

IX the formic acid-sodium formate mixture to obtain the final product II (R=H).

Compounds of Formula III in which $R^1$ is hydrogen are prepared by treatment of the known ketone 9H-quino[3,2,1-kl]-phenothiazin-9-one with the appropriate Grignard reagent as described above. The intermediate hydroxy compound (III, R=OH) is treated with the formic acid-sodium formate mixture to obtain the product (III, R=H), or, alternatively, dehydrated to an olefin of Formula V (X=S) and then reduced to the product, or converted by mineral acid treatment to an intermediate salt analogous to Formula IX, and finally converted to the product by means of formic acid-sodium formate.

Compounds of Formula IV in which $R^1$ is hydrogen are prepared in a manner analogous to that for compounds of Formulas II and III. The starting material 9H-[3,2,1-kl]-phenoxazin-9-one is prepared by treating phenoxazine with methyl o-iodobenzoate to give a 10-(o-carbomethoxyphenyl)phenoxazine, hydrolyzing the ester to an acid, and then ring-closing by treatment with phosphorous pentachloride and stannic chloride.

Compounds of Formulas I–IV in which $R^1$ is chloro or trifluoromethyl are prepared by starting with the chloro or trifluoromethyl carbazole, phenothiazine, or phenoxazine, forming the pentacyclic ketone as described above, reaction with the Grignard reagent, and finally conversion to the product.

A variety of tert-aminoalkyl side chains may be employed in the Grignard reactions described above. The Grignard reagents are prepared from the aminoalkyl halides in the conventional manner, e.g. refluxing the halide with magnesium in a solvent such as tetrahydrofuran. Among the preferred aminoalkyl halides are 3-dimethylaminopropyl chloride, 3-diethylaminopropyl chloride, 3-piperidinopropyl chloride, 3-(4-methylpiperazino)propyl bromide, 3-pyrrolidinopropyl chloride, and 3-dimethylamino-2-methylpropyl bromide.

The basic amino compounds of the invention readily form acid addition salts with nontoxic, pharmaceutically acceptable acids such as the hydrochloride, hydrobromide, sulfate, citrate, pamoate, maleate, cyclohexylsulfamate, nitrate, acetate, tartrate, and succinate. Such salts are prepared by conventional procedure and are the full equivalents of the free bases of the invention.

The novel compounds of this invention are administered orally or parenterally in conventional dosage forms such as tablets, capsules, injectables or the like, by incorporation of an effective, but nontoxic dose of the compound, or a pharmaceutically acceptable acid addition salt thereof, with conventional carriers according to acceptable pharmaceutical practice.

The following examples are intended to illustrate the preparation of the compounds of the invention, but are not to be construed as limiting the scope thereof:

EXAMPLE 1

*8-(3-dimethylaminopropyl)-8H-indolo[3,2,1-de]acridane*

3-dimethylaminopropyl magnesium chloride is formed by reaction under nitrogen of 6.6 g. (.0457 mole) of 3-dimethylaminopropyl chloride and 1.3 g. (.0547 mole) of magnesium in the minimum volume of dry tetrahydrofuran to initiate the reaction. The volume is brought to about 150–200 ml. and the mixture refluxed for an hour to complete the formation of the Grignard.

To this mixture is slowly added 9.8 g. (.0365 mole) of 8H-indolo[3,2,2-de]acridan-8-one [J. Am. Chem. Soc. 63, 1758 (1941)] and the mixture is then refluxed for 4–5 hours. The solvent is evaporated to a small volume, the residue added to an ammonium chloride solution, and the insoluble oil extracted with ether. The ether extracts are then extracted with dilute hydrochloric acid, and the acid extracts are slowly basified, while cooling and stirring, with 40% sodium hydroxide solution. The resulting solid, 8-(3-dimethylaminopropyl)-8-hydroxy-8H-indolo[3,2,1-de]acridane, is obtained by filtration.

A small quantity of this hydroxy compound in ethanol is treated with ethereal hydrogen chloride and an excess of ether added. The resulting solid is recrystallized from ethanol-ether to give 8-(3-dimethylaminopropyl)indolo[3,2,1-de]acridinium chloride hydrochloride, M.P. 127° C.

A mixture of 6.0 g. of the above hydroxy compound, 60 g. of sodium formate, and 180 ml. of 98% formic acid is refluxed for 24 hours. The solution is evaporated to a small volume, water is added, the solution is made basic with 40% sodium hydroxide solution, and the basic solution is extracted with ether. The extracts are evaporated and the residual base is chromatographed on Woelm basic #1 alumina, using hexane, to give the title product, B.P. 215–18°/0.25 mm.

The quaternary salt described above is treated with formic acid and sodium formate as described above to give the same title product.

Distillation of the above hydroxy compound twice at 0.01–.1 mm. results in the formation of 8-(3-dimethylaminopropylidene)-8H-indolo[3,2,1-de]acridane.

A mixture of 2.5 g. of 8-(3-dimethylaminopropylidene)-8H-indolo[3,2,1-de]acridane, 0.85 g. of 10% palladium-on-charcoal, and 65 ml. of ethanol is hydrogenated for several hours. Filtration of the catalyst and evaporation of the solvent in vacuo gives the title product.

EXAMPLE 2

Treatment of the indoloacridone with the following aminoalkyl Grignard reagents as described in Example 1 results in the formation of the corresponding hydroxy intermediates listed below. Treatment of the hydroxy intermediates with sodium formate and formic acid as in Example 1 results in the formation of the corresponding products listed below.

Grignard: 3-diethylaminopropyl magnesium chloride.
Intermediate: 8 - (3-diethylaminopropyl)-8-hydroxy-8H-indolo[3,2,1-de]acridane.
Product: 8 - (3-diethylaminopropyl)-8H-indolo[3,2,1-de] acridane.
Grignard: 3-piperidinopropyl magnesium chloride.
Intermediate: 8 - (3 - piperidinopropyl) - 8 - hydroxy-8H-indolo[3,2,1-de]acridane.
Product: 8 - (3 - piperidinopropyl) - 8H-indolo[3,2,1-de] acridane.

EXAMPLE 3

Distillation of the hydroxy intermediates of Example 2 as described in Example 1 results in the formation of the following olefin intermediates, respectively:

8-(3-diethylaminopropylidene)-8H-indolo[3,2,1-de] acridane.
8-(3-piperidinopropylidene)-8H-indolo[3,2,1-de] acridane.

When each of these olefin intermediates is hydrogenated as described in Example 1, the title products of Example 2 are obtained, respectively.

EXAMPLE 4

9-(3-dimethylaminopropyl)-9H-quino[3,2,1-kl] phenothiazine

To a solution of 3-dimethylaminopropyl magnesium chloride (prepared from 6.1 g. of 3-dimethylaminopropyl chloride and 1.2 g. of magnesium) in 150–200 ml. of dry tetrahydrofuran is slowly added 10.0 g. of 9H-quino[3,2,1-kl]phenothiazin-9-one [J. Am. Chem. Soc. 66, 625–7 (1944)], and the mixture is stirred and refluxed for 4–5 hours. The solvent is evaporated to a small volume and the residue added to an ammonium chloride solution. The resulting oil is extracted wtih ether, the ethereal extracts extracted with dilute hydrochloric acid, and the acidic extracts basified, with cooling, with 40% sodium hydroxide solution. The resulting solid, 9-(3-dimethylaminopropyl) - 9 - hydroxy-9H-quino[3,2,1-kl]phenothiazine, is obtained by filtration.

A mixture of 9.2 g. of the above hydroxy compound, 45 g. of sodium formate, and 250 ml. of 98% formic acid is refluxed for 22 hours. The mixture is evaporated to a small volume, water is added, the solution basified with sodium hydroxide, the basic solution extracted with ether, and the ethereal solution chromatographed on Woelm basic #1 alumina. Evaporation of the ether eluate gives the title product. A hydrochloride salt is formed by adding ethereal hydrogen chloride to an ether solution of this product. Two recrystallizations from acetone gives the salt, M.P. 182° d.

When the hydroxy intermediate is twice distilled at 0.01–0.1 mm., 9 - (3 - dimethylaminopropylidene) - 9H-quino[3,2,1-kl]phenothiazine is formed. Hydrogenation of this olefin as in Example 1 gives the title product.

EXAMPLE 5

Treatment of the quinophenothiazinone with the following aminoalkyl Grignard reagents as described in Example 4 results in the formation of the corresponding hydroxy intermediates listed below. Treatment of the hydroxy intermediates with sodium formate and formic acid as in Example 4 results in the formation of the corresponding products listed below.

Grignard: 3-(4-methylpiperazino)propyl magnesium bromide.
Intermediate: 9-[3-(4-methylpiperazino)propyl]-9-hydroxy-9H-quino[3,2,1-kl]phenothiazine.
Product: 9-[3-(4-methylpiperazino)propyl]-9H-quino[3,2,1-kl]phenothiazine.
Grignard: 3-pyrrolidinopropyl magnesium chloride.
Intermediate: 9-(3-pyrrolidinopropyl)-9-hydroxy-9H-quino[3,2,1-kl]phenothiazine.
Product: 9-(3-pyrrolidinopropyl)-9H-quino[3,2,1-kl] phenothiazine.
Grignard: 3-dimethylamino-2-methylpropyl bromide.
Intermediate: 9-(3-dimethylamino-2-methylpropyl)-9-hydroxy-9H-quino[3,2,1-kl]phenothiazine.
Product: 9-(3-dimethylamino-2-methylpropyl)-9H-quino[3,2,1-kl]phenothiazine.

EXAMPLE 6

9H-quino[3,2,1-kl]phenoxazine-9-one

A mixture of 13.2 g. (0.05 mole) of methyl o-iodobenzoate, 9.2 g. (0.05 mole) of phenoxazine, 6 ml. of nitrobenzene, 7.5 g. of potassium carbonate, 85 ml. of xylene, and 0.2 g. of copper bronze is stirred and refluxed for 14 hours. The mixture is filtered hot and washed with boiling xylene. Upon cooling, crystals of 10-(o-carbomethoxyphenyl)phenoxazine precipitate.

A suspension of 6.3 g. (0.02 mole) of this ester in 125 ml. of 15% aqueous potassium hydroxide is refluxed for 5 hours. The resulting solution is diluted with water and acidified with hydrochloric acid to give the acid.

To a suspension of 1.5 g. (0.0047 mole) of 10-(o-carboxyphenyl)phenoxazine in 60 ml. of dry xylene is added 1.4 g. (0.0067 mole) of phosphorus pentachloride, and the mixture stirred at room temperature for ten minutes to give a clear solution. The solution is cooled in an ice-bath, and a solution of 6.25 g. (0.024 mole) of anhydrous stannic chloride in 20 ml. of xylene is added dropwise to the stirred solution over a period of ten minutes. The stirring is continued for forty-five minutes after the addition has been completed. The mixture is hydrolyzed by the dropwise addition of 25 ml. of cold concentrated hydrochloric acid followed by 30 ml. of water. The xylene layer is separated, washed with dilute sodium carbonate solution to remove acid, and evaporated to dryness to yield a solid. This solid is recrystallized from a mixture of benzene-petroleum ether (B.P. 80–110°) to give the title product.

EXAMPLE 7

9-[3-(4-methylpiperazino)propyl]-9H-quino[3,2,1-kl] phenoxazine 9H-quino,[3,2,1-kl]phenoxazin-9-one is treated with 3-(4-methylpiperazino)propyl magnesium chloride as described in Example 4 to give 9H-9-[3-(4-methylpiperazino)propyl] - 9 - hydroxyquino[3,2,1-kl-]phenoxazine. Treatment of this hydroxy intermediate with sodium formate and formic acid as in Example 4 results in the formation of the title product. Distillation of the hydroxy intermediate in vacuo results in the formation of 9-[3-(4- methylpiperazino)propylidene] - 9H - quino[3,2,1 - kl] phenoxazine which is then catalytically hydrogenated to give the title product.

Reaction of the quinophenoxazinone with the Grignard reagents named in Examples 2 and 5 according to the procedures described therein, followed by reduction of the resulting hydroxy compounds, results in the formation of the aminoalkylquinophenoxazines corresponding to the particular Grignard reagents used.

EXAMPLE 8

2-chloro-8H-indolo[3,2,1-de]acridan-8-one is prepared by starting with 10 g. (.05 mole) of 2-chlorocarbazole and following the procedure of Example 6.

Treatment of this compound with the following aminoalkyl Grignard reagents as described in Example 1 results in the formation of the corresponding hydroxy intermediates listed below. Treatment of the hydroxy intermediates with sodium formate and formic acid as in Example 1 results in the formation of the corresponding products listed below.

Grignard: 3-dimethylaminopropyl magnesium chloride.
Intermediate: 2-chloro-8-(3-dimethylaminopropyl)-8-hydroxy-8H-indolo[3,2,1-de]acridane.
Product: 2-chloro-8-(3-dimethylaminopropyl)-8H-indolo[3,2,1-de]acridane.
Grignard: 3-(4-methylpiperazino)propyl magnesium chloride.
Intermediate: 2-chloro-8-[3-(4-methylpiperazino)propyl]-8-hydroxy-8H-indolo[3,2,1-de]acridane.
Product: 2-chloro-8-[3-(4-methylpiperazino)propyl]-8H-indolo[3,2,1-de]acridane.

EXAMPLE 9

2 - trifluoromethyl - 9H - quino[3,2,1 - kl]phenothiazin-9-one is prepared by starting with 13.4 g. (.05 mole) of 2-trifluoromethylphenothiazine and following the procedure of Example 6.

Treatment of this compound with 3-dimethylaminopropyl magnesium chloride as described in Example 1 results in the formation of 2-trifluoromethyl-9-(3-dimethylaminopropyl) - 9 - hydroxy - 9H - quino[3,2,1 - kl] phenothiazine. Treatment of this intermediate with sodium formate and formic acid as in Example 1 results in the formation of 2-trifluoromethyl-9-(3-dimethylaminopropyl)-9H-quino[3,2,1-kl]phenothiazine.

I claim:

1. A compound of the formula

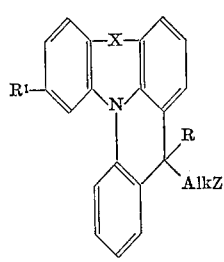

or a pharmaceutically acceptable acid addition salt thereof, wherein:

X is a single bond, oxygen, or sulfur;
R is hydrogen or hydroxy;
$R^1$ is hydrogen, chloro, or trifluoromethyl;
Alk is propylene or 2-methylpropylene; and
Z is dilower alkylamino, pyrrolidino, piperidino, morpholino, or 4-methylpiperazino.

2. A compound of the formula

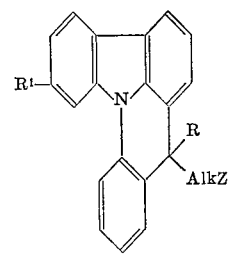

or a pharmaceutically acceptable acid addition salt thereof, wherein:

R is hydrogen or hydroxy;
$R^1$ is hydrogen, chloro, or trifluoromethyl;
Alk is propylene or 2-methylpropylene; and
Z is dilower alkylamino, pyrrolidino, piperidino, morpholino, or 4-methylpiperazino.

3. A compound of the formula

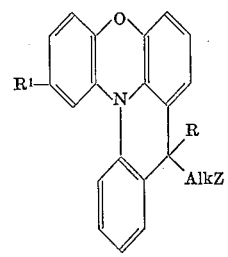

or a pharmaceutically acceptable acid addition salt thereof, wherein:

R is hydrogen or hydroxy;
$R^1$ is hydrogen, chloro, or trifluoromethyl;
Alk is propylene or 2-methylpropylene; and
Z is dilower alkylamino, pyrrolidino, piperidino, morpholino, or 4-methylpiperazino.

4. A compound of the formula

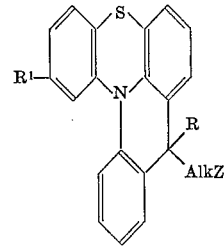

or a pharmaceutically acceptable acid addition salt thereof, wherein:

R is hydrogen or hydroxy;
$R^1$ is hydrogen, chloro, or trifluoromethyl;
Alk is propylene or 2-methylpropylene; and
Z is dilower alkylamino, pyrrolidino, piperidino, morpholino, or 4-methylpiperazino.

5. A compound of the formula

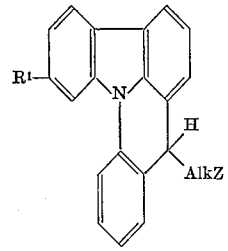

or a pharmaceutically acceptable acid addition salt thereof, wherein:

$R^1$ is hydrogen, chloro, or trifluoromethyl;
Alk is propylene or 2-methylpropylene; and Z is dilower alkylamino, pyrrolidino, piperidino, morpholino, or 4-methylpiperazino.

6. A compound of the formula

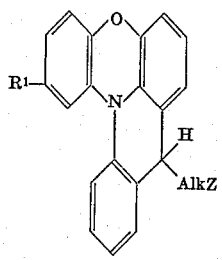

or a pharmaceutically acceptable acid addition salt thereof, wherein:

R¹ is hydrogen, chloro, or trifluoromethyl;
Alk is propylene or 2-methylpropylene; and
Z is dilower alkylamino, pyrrolidino, piperidino, morpholino, or 4-methylpiperazino.

7. A compound of the formula

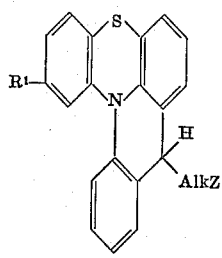

or a pharmaceutically acceptable acid addition salt thereof, wherein:

R¹ is hydrogen, chloro, or trifluoromethyl;
Alk is propylene or 2-methylpropylene; and
Z is dilower alkylamino, pyrrolidino, piperidino, morpholino, or 4-methylpiperazino.

8. A compound of the formula

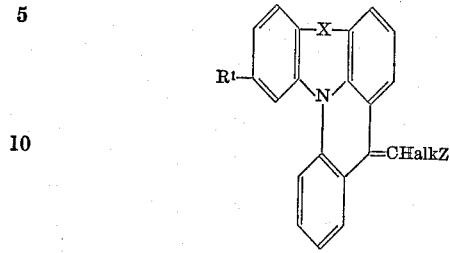

wherein:

X is a single bond, oxygen, or sulfur;
R¹ is hydrogen, chloro, or trifluoromethyl;
Alk is ethylene or 1-methylethylene; and
Z is dilower alkylamino, pyrrolidino, piperidino, morpholino, or 4-methylpiperazino.

9. 8-(3-dimethylaminopropyl) - 8H - indolo[3,2,1-de]acridane.

10. 8-(3-dimethylaminopropyl) - 8-hydroxy-8H-indolo[3,2,1-de]acridane.

11. 8-(3 - dimethylaminopropyl)indolo[3,2,1-de]acridinium chloride hydrochloride.

12. 8-(3-dimethylaminopropylidene) - 8H-indolo[3,2,1-de]acridene.

13. 9-(3-dimethylaminopropyl) - 9H - quino[3,2,1-kl]phenothiazine.

14. 9-(3-dimethylaminopropyl) - 9 - hydroxy-9H-quino[3,2,1-kl]phenothiazine.

No references cited.

WALTER A. MODANCE, *Primary Examiner.*
H. I. MOATZ, *Assistant Examiner.*